(12) United States Patent
Wang

(10) Patent No.: US 11,962,808 B2
(45) Date of Patent: Apr. 16, 2024

(54) VIDEO USABILITY INFORMATION IN COMMON MEDIA APPLICATION FORMAT

(71) Applicant: Lemon Inc., Grand Cayman (KY)

(72) Inventor: Ye-kui Wang, San Diego, CA (US)

(73) Assignee: LEMON INC.

( * ) Notice: Subject to any disclaimer, the term of this patent is extended or adjusted under 35 U.S.C. 154(b) by 0 days.

(21) Appl. No.: 17/719,217

(22) Filed: Apr. 12, 2022

(65) Prior Publication Data

US 2022/0337860 A1    Oct. 20, 2022

Related U.S. Application Data

(60) Provisional application No. 63/176,315, filed on Apr. 18, 2021.

(51) Int. Cl.
| | |
|---|---|
| *H04N 19/70* | (2014.01) |
| *H04N 7/01* | (2006.01) |
| *H04N 19/169* | (2014.01) |
| *H04N 19/172* | (2014.01) |
| *H04N 19/44* | (2014.01) |

(Continued)

(52) U.S. Cl.
CPC ............ *H04N 19/70* (2014.11); *H04N 7/01* (2013.01); *H04N 19/172* (2014.11); *H04N 19/188* (2014.11); *H04N 19/1883* (2014.11); *H04N 19/44* (2014.11); *H04N 19/46* (2014.11); *H04N 19/463* (2014.11)

(58) Field of Classification Search
CPC ........ H04N 19/70; H04N 7/01; H04N 19/172; H04N 19/188; H04N 19/1883; H04N 19/44; H04N 19/46; H04N 19/463; H04N 21/2362; H04N 21/8451; H04N 21/8456; H04N 21/85406; H04N 19/117; H04N 19/184; H04N 19/42; H04N 19/91; H04N 21/84; H04N 19/60

See application file for complete search history.

(56) References Cited

U.S. PATENT DOCUMENTS

2020/0154144 A1* 5/2020 Deshpande .......... H04N 19/188
2020/0322406 A1* 10/2020 Deshpande ............ H04N 19/46
(Continued)

FOREIGN PATENT DOCUMENTS

| JP | 2016506693 A | 3/2016 |
| JP | 2020515169 A | 5/2020 |

(Continued)

OTHER PUBLICATIONS

"Text of ISO/IEC 23000-19 2nd 3dition Common Media Application Format", (hereinafter ISO/IEC 23000-19) MPEG Meeting; ISO/IEC JTC1/SC 29/WG11 N18636, Gothenburg, SE—Jul. 2019 (Year: 2019).*

(Continued)

Primary Examiner — Dramos Kalapodas
(74) Attorney, Agent, or Firm — Conley Rose, P.C.

(57) ABSTRACT

A mechanism for processing video data is disclosed. Information in a sequence parameter set (SPS) in a Versatile Video Coding (VVC) Common Media Application Format (CMAF) track is determined. A rule specifies a value of a video usability information progressive source flag (vui_progressive_source_flag) field in the SPS shall be equal to one. A conversion is performed between a visual media data and a media data file based on the SPS.

20 Claims, 7 Drawing Sheets

(51) Int. Cl.
*H04N 19/46* (2014.01)
*H04N 19/463* (2014.01)

(56) References Cited

U.S. PATENT DOCUMENTS

| | | | | |
|---|---|---|---|---|
| 2021/0044639 A1* | 2/2021 | Tielemans | ........... | H04N 19/132 |
| 2021/0274204 A1* | 9/2021 | He | ................ | H04N 19/187 |
| 2023/0120726 A1* | 4/2023 | Deng | ............... | H04N 19/1883 |
| | | | | 375/240.26 |

FOREIGN PATENT DOCUMENTS

| | | | | |
|---|---|---|---|---|
| WO | WO-2014047202 A2 * | 3/2014 | ........... | H04N 13/178 |
| WO | WO-2015057787 A1 * | 4/2015 | ........... | H04N 19/105 |
| WO | WO-2015140391 A1 * | 9/2015 | ............ | H04N 19/11 |

OTHER PUBLICATIONS

ITU-T Standard H.274, (hereinafter H.274) "Versatile supplemental enhancement information messages for coded video bitstreams; H.274 (Aug. 2020)", ITU-T Standard H.274, International Telecommunication Union, Geneva ; CH , No. H.274 (Aug. 2020) Aug. 29, 2020 (Aug. 29, 2020), pp. 1-83, XP044296170 (Year: 2020).*
"Text of ISO/IEC 23000-19:2019 CDAM 2 CMAF Media Profiles for MPEG-H 3D Audio, EVC, VVC and other technologies", (hereinafter ISO/IEC 23000) 133. MPEG Meeting; Jan. 11, 2021-Jan. 15, 2021; Online; (Motion Picture Expert Group or ISO/IEC JTC1/SC29/WG11), No. n19970 Jan. 20, 2021 (Jan. 20, 2021), XP030290102. (Year: 2021).*
"ITU-T, H.266; Versatile Video Coding" Aug. 2020 Sec.9.6 (Year: 2020).*
ISO/IEC JTC 1/SC 29/WG 03, N0137 "Text of ISO/IEC 23000-19:2019 CDAM 2 CMAF Media Profiles for MPEG-H 3D Audio, EVC, VVC and other technologies," JVET-U1004-Errata report items for VVC,VSEI,HEVC,AVC,Video CICP, and CP usage TR, Jan. 15, 2021, 25 pages.
"Series H: Audiovisual and Multimedia Systems; Infrastructure of audiovisual services—Coding of moving video; Versatile video coding," Recommendation ITUI-T H.266, Aug. 2020, 249 pages.
"Information technology—Coding of audio-visual objects—Part 12: ISO base media file format, Technical Corrigendum 1," ISO/IEC 14496-12:2015/Cor.1, Jun. 3, 2016, 303 pages.
Systems "ISO/IEC 23000-19:2019 AMD 1 Additional CMAF HEVC media profiles," ISO/IEC JTC 1/SC29/WG11 N19055, Jan. 17, 2020, 10 pages.
Foreign Communication From A Foreign Counterpart Application, European Application No. 22168682.7, Extended European Search Report dated Sep. 9, 2022, 11 pages.
Foreign Communication From A Foreign Counterpart Application, European Application No. 22168684.3, Extended European Search Report dated Sep. 13, 2022, 11 pages.
Foreign Communication From A Foreign Counterpart Application, European Application No. 22168685.0, Extended European Search Report dated Sep. 14, 2022, 11 pages.
"Information technology—High efficiency coding and media delivery in heterogeneous environments—Part 2: High Efficiency Video Coding," ISO/IEC JTC 1/SC 29/WG 11 N17661; ISO/IEC DIS 23008-2:201x (4th Ed.) Apr. 20, 2018, 8 pages.
Document: JVET-G1001-v1 Chen, J., et al., "Algorithm Description of Joint Exploration Test Model 7 (JEM7)," Joint Video Exploration Team (JVET) of ITU-T SG 16 WP 3 and ISO/IEC JTC 1/SC 29/WG 11; 7th Meeting: Torino, IT, Jul. 13-21, 2017, 48 pages.
"Information technology—Coded representation of immersive media—Part 3: Versatile video coding," ISO/IEC JTC 1/SC 29 /WG 11 N 18692; Text of ISO/IEC CD 23090-3; Jul. 12, 2019, 445 pages.
Document: JVET-S2001-vH Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
"Series H: Audiovisual and Multimedia Systems Infrastructure of audiovisual services—Coding of moving video Versatile supplemental enhancement information messages for coded video bitstreams," Recommendation ITU-T Rec. H.274 Aug. 2020, 86 pages.
Document: JVET-S2007-v1 Boyce, J., et al., "Supplemental enhancement information for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020, 83 pages.
Stockhammer, T., "Editor's Version of DASH IS 4th Edition," ISO/IEC JTC1/SC29/WG11 MPEG2019/m52458, Jan. 2020, 287 pages.
Draft text of ISO/IEC 14496-15:2019 FDAM 2 Carriage of VVC and EVC in ISOBMFF, ISO/IEC JTC 1/SC 29/WG 03 N00149, Feb. 26, 2021, 284 pages.
"Information technology—High efficiency coding and media delivery in heterogeneous environments—Part 12: Image File Format—Amendment 2: Support for VVC, EVC, slideshows and other improvements," ISO/IEC 23008-12:2017/DAM 2:2021(E), Jan. 2021, 39 pages.
Systems "Text of ISO/IEC FDIS 23000-19 2nd edition Common Media Application Format," ISO/IEC JTC 1/SC 29/WG 11 N18636, Aug. 13, 2019, 146 pages.
"Text of ISO/IEC 23000-19:2019 CDAM 2 CMAF Media Profiles for MPEG-H 3D Audio, EVC, VVC and other technologies," ISO/IEC JTC 1/SC 29/WG 03 N0137, Jan. 15, 2021, 25 pages.
Foreign Communication From A Related Counterpart Application, Indian Application No. 202224022667, Indian Office Action dated Dec. 19, 2022, 6 pages.
Tomohiro Ikari, Takeshi Nakajo, outline of abstract video coding, Journal of the Japan Society of image information and Television Engineers, vol. 75, No. 1, 2021, 5 pages. With English Translation.
Non-Final Office Action from U.S. Appl. No. 17/719,192 dated Aug. 8, 2023, 36 pages.
Final Office Action from U.S. Appl. No. 17/719,201 dated Sep. 25, 2023, 20 pages.
"Series H: Audiovisual and Multimedia Systems Infrastructure of audiovisual services—Coding of moving video Versatile video coding," Recommendation ITU-T H.266, Aug. 2020, pp. 38-44,55,114,138,139,498,499, 516 pages total.
"Series H: Audiovisual and Multimedia Systems Infrastructure of audiovisual services—Coding of moving video Versatile video coding," Recommendation ITU-T H.266, Aug. 2020, pp. 36-44, 55-58, 138, 139, 144, 145, 442-476, 516 pages total.
Document: JVET-U1004-v1, Rosewarne, C., et al., "Errata report items for VVC, VSEI, HEVC, AVC, Video CICP, and CP Usage TR," Joint Video Experts Team (JVET) of ITU-T SG 16 WP 3 and ISO/IEC JTC 1/SC 29 21st Meeting, by teleconference, Jan. 6-15, 2021, 35 pages.
Begen, A., et al., "Are the Streaming Format Wars Over," Proceedings of 2018 IEEE International Conference on Multimedia, Expo Workshops (ICMEW), Electronic ISBN:978-1-5386-4195-8, DOI: 10.1109/ICMEW.2018.8551563, Jul. 27, 2018, 4 pages.

* cited by examiner

US 11,962,808 B2

VIDEO USABILITY INFORMATION IN COMMON MEDIA APPLICATION FORMAT

CROSS-REFERENCE TO RELATED APPLICATIONS

This patent application claims the benefit of U.S. Provisional Patent Application No. 63/176,315 filed Apr. 18, 2021 by Ye-Kui Wang, and titled "Constraints on Video Encoding and Encapsulation For Adaptative Video Streaming," which is hereby incorporated by reference.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining information in a sequence parameter set (SPS) in a Versatile Video Coding (VVC) Common Media Application Format (CMAF) track, wherein a rule specifies a value of a video usability information progressive source flag (vui_progressive_source_flag) field in the SPS shall be equal to one; and performing a conversion between a visual media data and a media data file based on the SPS.

Optionally, in any of the preceding aspects, another implementation of the aspect provides that the vui_progressive_source_flag is included in a video usability information payload (vui_payload) structure.

Optionally, in any of the preceding aspects, another implementation of the aspect provides that the vui_progressive_source_flag is equal to one to indicate that a video in the VVC CMAF track is coded according to progressive scanning.

Optionally, in any of the preceding aspects, another implementation of the aspect provides that the rule specifies a value of video usability information interlaces source flag (vui_interlaced_source_flag) field in the SPS shall be equal to one.

Optionally, in any of the preceding aspects, another implementation of the aspect provides that the vui_interlaced_source_flag is included in a video usability information payload (vui_payload) structure.

Optionally, in any of the preceding aspects, another implementation of the aspect provides that the vui_interlaced_source_flag is equal to one to indicate that a video in the VVC CMAF track is coded according to interlacing.

Optionally, in any of the preceding aspects, another implementation of the aspect provides that the SPS is contained in a VVC elementary stream, and wherein the VVC elementary stream is contained in the CMAF track.

Optionally, in any of the preceding aspects, another implementation of the aspect provides that the conversion includes encoding the visual media data into the media data file.

Optionally, in any of the preceding aspects, another implementation of the aspect provides that the conversion includes decoding the visual media data from the media data file.

A second aspect relates to apparatus for processing video data comprising: a processor; and a non-transitory memory with instructions thereon, wherein the instructions upon execution by the processor, cause the processor to: determine information in a sequence parameter set (SPS) in a Versatile Video Coding (VVC) Common Media Application Format (CMAF) track, wherein a rule specifies a value of a video usability information progressive source flag (vui_progressive_source_flag) field in the SPS shall be equal to one; and perform a conversion between a visual media data and a media data file based on the SPS.

Optionally, in any of the preceding aspects, another implementation of the aspect provides that the vui_progressive_source_flag is included in a video usability information payload (vui_payload) structure.

Optionally, in any of the preceding aspects, another implementation of the aspect provides that the vui_progressive_source_flag is equal to one to indicate that a video in the VVC CMAF track is coded according to progressive scanning.

Optionally, in any of the preceding aspects, another implementation of the aspect provides that the rule specifies a value of video usability information interlaces source flag (vui_interlaced_source_flag) field in the SPS shall be equal to one.

Optionally, in any of the preceding aspects, another implementation of the aspect provides that the vui_interlaced_source_flag is included in a video usability information payload (vui_payload) structure.

Optionally, in any of the preceding aspects, another implementation of the aspect provides that the vui_interlaced_source_flag is equal to one to indicate that a video in the VVC CMAF track is coded according to interlacing.

Optionally, in any of the preceding aspects, another implementation of the aspect provides that the SPS is contained in a VVC elementary stream, and wherein the VVC elementary stream is contained in the CMAF track.

A third aspect relates to a non-transitory computer readable medium comprising a computer program product for use by a video coding device, the computer program product comprising computer executable instructions stored on the non-transitory computer readable medium such that when executed by a processor cause the video coding device to: determine information in a sequence parameter set (SPS) in a Versatile Video Coding (VVC) Common Media Application Format (CMAF) track, wherein a rule specifies a value of a video usability information progressive source flag (vui_progressive_source_flag) field in the SPS shall be equal to one; and perform a conversion between a visual media data and a media data file based on the SPS.

Optionally, in any of the preceding aspects, another implementation of the aspect provides the vui_progressive_source_flag is included in a video usability information payload (vui_payload) structure.

Optionally, in any of the preceding aspects, another implementation of the aspect provides that the vui_progressive_source_flag is equal to one to indicate that a video in the VVC CMAF track is coded according to progressive scanning.

Optionally, in any of the preceding aspects, another implementation of the aspect provides that the rule specifies a value of video usability information interlaces source flag (vui_interlaced_source_flag) field in the SPS shall be equal to one.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
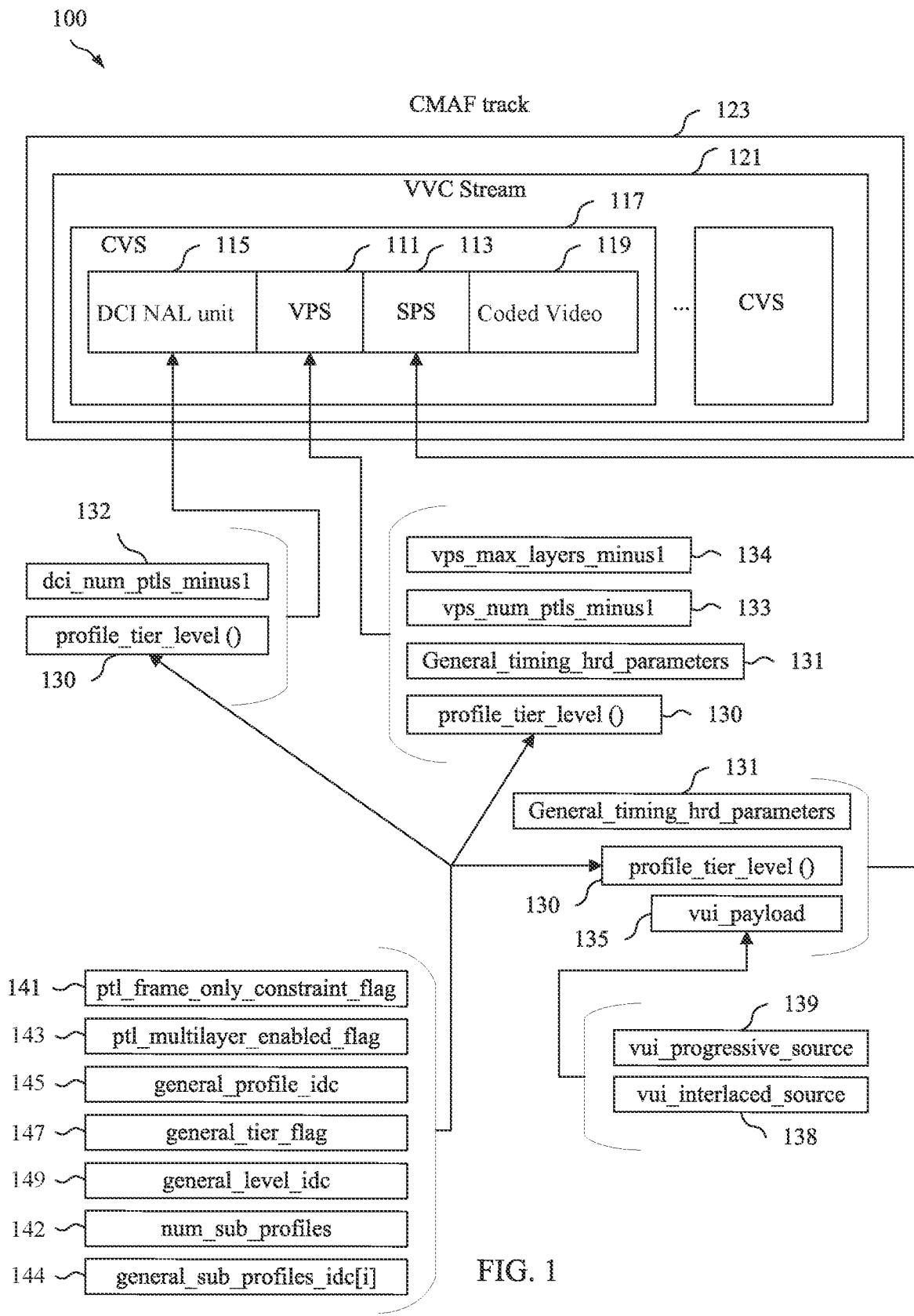
FIG. 1 is a schematic diagram illustrating an example Common Media Application Format (CMAF) track.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

This patent document is related to a video streaming. Specifically, this document is related to specifying constraints on video encoding and encapsulation into media tracks and segments in a file format. Such file formats may include International Organization for Standardization (ISO) base media file format (ISOBMFF). Such file formats may also include an adaptive streaming media representation format, such as Dynamic Adaptive Streaming over hypertext transfer protocol (DASH) and/or Common Media Application Format (CMAF). The ideas described herein may be applied individually or in various combinations, for media streaming systems, such systems based on the DASH standard and related extensions and/or based on the CMAF standard and related extensions.

The present disclosure includes the following abbreviations. Adaptive color transform (ACT), adaptive loop filter (ALF), adaptive motion vector resolution (AMVR), adaptation parameter set (APS), access unit (AU), access unit delimiter (AUD), advanced video coding (Rec. ITU-T H.264|ISO/IEC 14496-10) (AVC), bi-predictive (B), bi-prediction with coding unit level weights (BCW), bi-directional optical flow (BDOF), block-based delta pulse code modulation (BDPCM), buffering period (BP), context-based adaptive binary arithmetic coding (CABAC), coding block (CB), constant bit rate (CBR), cross-component adaptive loop filter (CCALF), coded picture buffer (CPB), clean random access (CRA), cyclic redundancy check (CRC), coding tree block (CTB), coding tree unit (CTU), coding unit (CU), coded video sequence (CVS), decoding capability information (DCI), decoding initialization information (DII), decoded picture buffer (DPB), dependent random access point (DRAP), decoding unit (DU), decoding unit information (DUI), exponential-Golomb (EG), k-th order exponential-Golomb (EGk), end of bitstream (EOB), end of sequence (EOS), filler data (FD), first-in, first-out (FIFO), fixed-length (FL), green, blue, and red (GBR), general constraints information (GCI), gradual decoding refresh (GDR), geometric partitioning mode (GPM), high efficiency video coding, also known as Rec. ITU-T H.265|ISO/IEC 23008-2, (HEVC), hypothetical reference decoder (HRD), hypothetical stream scheduler (HSS), intra (I), intra block copy (IBC), instantaneous decoding refresh (IDR), inter layer reference picture (ILRP), intra random access point (IRAP), low frequency non-separable transform (LFNST), least probable symbol (LPS), least significant bit (LSB), long-term reference picture (LTRP), luma mapping with chroma scaling (LMCS), matrix-based intra prediction (MIP), most probable symbol (MPS), most significant bit (MSB), multiple transform selection (MTS), motion vector prediction (MVP), network abstraction layer (NAL), output layer set (OLS), operation point (OP), operating point information (OPI), predictive (P), picture header (PH), picture order count (POC), picture parameter set (PPS), prediction refinement with optical flow (PROF), picture timing (PT), picture unit (PU), quantization parameter (QP), random access decodable leading picture (RADL), random access skipped leading picture (RASL), raw byte sequence payload (RBSP), red, green, and blue (RGB), reference picture list (RPL), sample adaptive offset (SAO), sample aspect ratio (SAR), supplemental enhancement information (SEI), slice header (SH), subpicture level information (SLI), string of data bits (SODB), sequence parameter set (SPS), short-term reference picture (STRP), step-wise temporal sublayer access (STSA), truncated rice (TR), variable bit rate (VBR), video coding layer (VCL), video parameter set (VPS), versatile supplemental enhancement information, also known as Rec. ITU-T H.274|ISO/IEC 23002-7, (VSEI), video usability information (VUI), and versatile video coding, also known as Rec. ITU-T H.266|ISO/IEC 23090-3, (VVC).

Video coding standards have evolved primarily through the development of the International Telecommunication Union (ITU) Telecommunications Standardization Sector (ITU-T) and ISO/International Electrotechnical Commission (IEC) standards. The ITU-T produced H.261 and H.263, ISO/IEC produced Motion Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the further video coding technologies beyond HEVC, the Joint Video Exploration Team (JVET) was founded by Video Coding Experts Group (VCEG) and MPEG jointly. Many methods have been adopted by JVET and put into the reference software named Joint Exploration Model (JEM).

The JVET was later renamed to be the Joint Video Experts Team (JVET) when the Versatile Video Coding (VVC) project officially started. VVC is a coding standard targeting a 50% bitrate reduction as compared to HEVC. VVC has been finalized by the JVET.

The VVC standard, also known as ITU-T H.266|ISO/IEC 23090-3, and the associated Versatile Supplemental Enhancement Information (VSEI) standard, also known as ITU-T H.274|ISO/IEC 23002-7, are designed for use in a broad range of applications, such as television broadcast, video conferencing, playback from storage media, adaptive bit rate streaming, video region extraction, composition and merging of content from multiple coded video bitstreams, multiview video, scalable layered coding, and viewport-adaptive three hundred sixty degree (360°) immersive media. The Essential Video Coding (EVC) standard (ISO/IEC 23094-1) is another video coding standard developed by MPEG.

File format standards are discussed below. Media streaming applications are typically based on the Internet Protocol (IP), Transmission Control Protocol (TCP), and Hypertext Transfer Protocol (HTTP) transport methods, and typically rely on a file format such as the ISOBMFF. One such streaming system is dynamic adaptive streaming over HTTP (DASH). Video can be encoded in a video format, such as AVC and/or HEVC. The encoded video can be encapsulated in ISOBMFF tracks and included in DASH representations and segments. Important information about the video bitstreams, such as the profile, tier, and level, and many others, may be exposed as file format level metadata and/or in a DASH media presentation description (MPD) for content selection purposes. For example, such information can be used for selection of appropriate media segments both for initialization at the beginning of a streaming session and for stream adaptation during the streaming session.

Similarly, when using an image format with ISOBMFF, a file format specification specific to the image format, such as the AVC image file format and the HEVC image file format, may be employed. The VVC video file format, the file format for storage of VVC video content based on ISOBMFF, is under development by MPEG. The VVC image file format, the file format for storage of image content coded using VVC, based on ISOBMFF, is also under development by MPEG.

File format standards are now discussed. Media streaming applications may be based on the Internet Protocol (IP), Transmission Control Protocol (TCP), and Hypertext Transfer Protocol (HTTP) transport mechanisms. Such media streaming application may also rely on a file format such as the ISO base media file format (ISOBMFF). One such streaming system is dynamic adaptive streaming over HTTP (DASH). For using a video format with ISOBMFF and DASH, a file format specification specific to the video format may be employed for encapsulation of the video content in ISOBMFF tracks and in DASH representations and segments. Such file format specifications may include the AVC file format and the HEVC file format. Important information about the video bitstreams, such as the profile, tier, and level, and many others, may be exposed in file format level metadata and/or in a DASH media presentation description (MPD) for content selection purposes. For example, content select may include selection of appropriate media segments both for initialization at the beginning of a streaming session and for stream adaptation during the streaming session. Similarly, for using an image format with ISOBMFF, a file format specification specific to the image format, such as the AVC image file format and the HEVC image file format may be employed. The VVC video file format is the file format for storage of VVC video content based on ISOBMFF. The VVC video file format is developed by MPEG. The VVC image file format is the file format for storage of image content coded using VVC based on ISOBMFF. The VVC image file format is also developed by MPEG.

DASH is now discussed. In DASH, there may be multiple representations for video and/or audio data of multimedia content. Different representations may correspond to different coding characteristics, such as different profiles or levels of a video coding standard, different bitrates, different spatial resolutions, etc. The manifest of such representations may be defined in a Media Presentation Description (MPD) data structure. A media presentation may correspond to a structured collection of data that is accessible to a DASH streaming client device. The DASH streaming client device may request and download media data information to present a streaming service to a user of the client device. A media presentation may be described in the MPD data structure, which may include updates of the MPD.

A media presentation may contain a sequence of one or more periods. Each period may extend until the start of the next period or until the end of the media presentation in the case of the last period. Each period may contain one or more representations for the same media content. A representation may be one of a number of alternative encoded versions of audio, video, timed text, or other such data. The representations may differ by encoding types, for example by bitrate, resolution, codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other. Accordingly, a client device can dynamically and seamlessly switch between these representations, for example to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. For example, the client device may select an adaptation set including video representations, an adaptation set including audio representations, and/or an adaptation set including timed text. In an example, the client device may select adaptation sets for certain types of media such as video, and directly select representations for other types of media such as audio and/or timed text.

An example DASH streaming procedure can be shown by the following steps. The client obtains the MPD. The client then estimates the downlink bandwidth, and selects a video representation and an audio representation according to the estimated downlink bandwidth, the codec, the decoding capability, the display size, the audio language setting, etc. Until the end of the media presentation is reached, the client requests media segments of the selected representations and presents the streaming content to the user. The client keeps estimating the downlink bandwidth. When the bandwidth changes significantly, for example by becoming lower or becoming higher, the client selects a different video representation to match the newly estimated bandwidth, and continues to download segments at the updated downlink bandwidth.

CMAF is now discussed. CMAF specifies a set of constraints on media encoding and encapsulation into ISOBMFF tracks, ISOBMFF segments, ISOBMFF fragments, DASH representations, and/or CMAF tracks, CMAF fragments, etc. Such constraints are for encapsulation for each interoperability point defined as a media profile. The main goal of the CMAF development is to enable reuse of the same media content encoded using particular codecs, for example AVC for video, and encapsulated in particular formats, for example ISOBMFF, by the two separate media streaming worlds of DASH and the Apple HTTP Live Streaming (HLS).

Decoding Capability Information (DCI) in VVC is now discussed. The DCI NAL unit contains bitstream-level profile, tier, and level (PTL) information. The DCI NAL unit includes one or more PTL syntax structures that can be used during session negotiation between sender and receiver of a VVC bitstream. When the DCI NAL unit is present in a VVC bitstream, each output layer set (OLS) in the CVSs of the bitstream shall conform to the PTL information carried in at least one of the PTL structures in the DCI NAL unit. In AVC and HEVC, the PTL information for session negotiation is available in the SPS (for HEVC and AVC) and in the VPS (for HEVC layered extension). This design of conveying the PTL information for session negotiation in HEVC and AVC has disadvantages because the scope of SPS and VPS is within a CVS, instead of the whole bitstream. This may cause sender-receiver session initiation to suffer from re-initiation during bitstream streaming at every new CVS. DCI solves this problem since DCI carries bitstream-level information, and thus the compliance to the indicated decoding capability can be guaranteed until the end of the bitstream.

The Video Parameter Set (VPS) in VVC is now discussed. VVC bitstreams may contain a video parameter set (VPS) containing information describing layers and output layer sets (OLS) that are used for operation of the decoding process of scalable bitstreams. An OLS is a set of layers in the bitstream among which one or more layers are specified to be output from the decoder. Other layers identified in the OLS may also be decoded in order to decode the output layers, although such layers are not specified to be output. Much of the information contained in the VPS can be used in systems for purposes such as session negotiation and content selection. The VPS is introduced for handling multi-layer bitstreams. For single-layer VVC bitstreams, the presence of the VPS in the CVS is optional. This is because the information contained in the VPS is not necessary for the operation of the decoding process of the bitstream. Absence of a VPS in a CVS is indicated by referencing a VPS identifier (ID) equal to 0 in the SPS, in which case default values are inferred for the VPS parameters.

The Sequence Parameter Set (SPS) in VVC is now discussed. The SPS conveys sequence-level information shared by all pictures in an entire coded layer video sequence (CLVS). This includes PTL indicators, picture format, feature and/or tool control flags, coding, prediction, and/pr transform block structures and hierarchies, candidate RPLs that may be referenced by the encoder, etc. Picture format may include color sampling format, maximum picture width, maximum picture height, and bit depth. In most applications, only one or a few SPSs are employed for an entire bitstream. Thus, there would be no need to update a SPS within the bitstream. Updating a SPS may include sending a new SPS using the SPS ID of an existing SPS but with different values for certain parameters. Pictures from a particular layer that refer to SPSs with different SPS IDs or with the same SPS ID but with different SPS content belong to different CLVSs. As in AVC and HEVC, SPSs can be transported in-band, or using a mixture of in-band and out-of-band signaling. In-band signaling indicates data, such as the SPS, is transported together with the coded pictures, and out-of-band signaling indicates data, such as the SPS, is not transported together with the coded pictures.

The Picture Parameter Set (PPS) in VVC is now discussed. The PPS conveys picture-level information that is shared by all slices of a picture. Such information may also be shared across multiple pictures. This includes feature and/or tool on/off flags, picture width and height, default RPL sizes, configurations of tiles and slices, etc. By design two consecutive pictures can refer to two different PPSs. This may lead to a large number of PPS being used within a CLVS. In practice, the number of PPSs for an entire bitstream may not be high since the PPS is designed to carry parameters that do not change frequently and are likely to apply to multiple pictures. Therefore, there may be no need to update a PPS within a CLVS or even within an entire bitstream. An adaptation parameter set (APS) may be used for parameters that could apply to multiple pictures, but are expected to change frequently from picture to picture. Like SPSs, PPSs can be transported in-band, out-of-band, or using a mixture of in-band and out-of-band signaling. One basic design principle regarding which picture-level parameters should be included in the PPS versus which should be in the APS is the frequency at which such parameters are likely to change. Accordingly, frequently changing parameters are not included into the PPS in order to avoid requiring PPS updates, which would disallow out-of-band transmission of PPSs in typical use cases.

The Adaptation Parameter Set (APS) in VVC is now discussed. The APS conveys picture- and/or slice-level information that may be shared by multiple slices of a picture, and/or by slices of different pictures, but can change frequently across pictures. The APS supports information with a large total number of variants that are not suitable for inclusion in the PPS. Three types of parameters are included in APSs include adaptive loop filter (ALF) parameters, luma mapping with chroma scaling (LMCS) parameters, and scaling list parameters. APSs can be carried in two distinct NAL unit types, which may either precede or succeed the associated slices as a prefix or suffix. The latter can help in ultralow-delay scenarios, such as allowing an encoder to send the slices of a picture before generating ALF parameters, based on the picture, that are to be used by subsequent pictures in decoding order.

The Picture Header (PH) is now discussed. A picture header (PH) structure is present for each PU. A PH is present either in a separate PH NAL unit or included in the slice header (SH). The PH can only be included in the SH if the PU includes only one slice. To simplify the design, within a CLVS, PHs can only be either all in PH NAL units or all in SHs. When the PHs are in the SHs, there is no PH NAL unit in the CLVS. The PH is designed for two objectives. First, the PH helps reduce signaling overhead of SHs for pictures containing multiple slices per picture. The PH accomplishes this by carrying all parameters that have the same value for all slices of a picture, and thus preventing repetition of the same parameters in each SH. These include IRAP and/or GDR picture indications, inter and/or intra slices allowed flags, and information related to POC, RPL, deblocking filter, SAO, ALF, LMCS, scaling lists, QP delta, weighted prediction, coding block partitioning, virtual boundaries, the collocated picture, etc. Secondly, the PH helps the decoder to identify the first slice of each coded picture containing multiple slices. Since one and only one PH is present for each PU, the decoder knows that the next VCL NAL unit is the first slice of a picture when the decoder receives a PH NAL unit.

Operating Point Information (OPI) is now discussed. The decoding processes of HEVC and VVC have similar input variables to set the decoding operating point. These include the target OLS and the highest sublayer of the bitstream to be decoded through a decoder API. However, in scenarios where layers and/or sublayers of the bitstream are removed during transmission or a device does not expose the decoder application programming interface (API) to the application, the decoder may be unable to correctly determine the operating point for processing the bitstream. Hence, the decoder may not be able to conclude on the properties of pictures in the bitstream, such as proper buffer allocation for decoded pictures as well as whether individual pictures are output or not. In order to address this issue, VVC includes a mode of indicating these two variables within the bitstream through the OPI NAL unit. In the AUs at the beginning of the bitstream and the bitstream individual CVSs, the OPI NAL unit informs the decoder of the target OLS and the highest sublayer of the bitstream to be decoded. In the case when the OPI NAL unit is present and the operating point is also provided to the decoder via decoder API information, the decoder API information takes precedence. For example, the application may have more updated information related to the target OLS and sublayer. In absence of both a decoder API and any OPI NAL unit in the bitstream, suitable fallback choices are specified in VVC to allow proper decoder operation.

An example CMAF specification is now discussed. VVC video CMAF tracks may be described as follows. VVC CMAF tracks shall conform to the requirements of NAL structured video CMAF tracks. In addition, CMAF tracks may conform to all other requirements described herein. If the CMAF track conforms to these requirements, the CMAF track is referred to as VVC video CMAF track and may use the brand 'cvvc'. VVC video track constraints are also discussed. In an example, VVC video CMAF switching set constraints are as follows. Every CMAF track in the CMAF switching set shall conform to VVC video CMAF track as defined herein. VVC video CMAF switching set shall conform to constraints for NAL structured video CMAF switching set.

Visual sample entry is now discussed. The syntax and values of a visual sample entry of a VVC video track shall conform to VVCSampleEntry ('vvc1') or VVCSampleEntry ('vvci') sample entries. Constraints on VVC elementary streams are now discussed. Regarding VPS, each VVC video media sample in the CMAF track shall reference a SPS with sps_video_parameter_set_id equal to 0, in which case there is no VPS in the elementary stream, or shall reference the VPS in the CMAF header sample entry. If present, the following additional constraints apply. For each profile_tier_level( ) structure in VPS, the value of the following fields shall not change throughout a VVC elementary stream: general_profile_idc; general_tier_flag; general_level_idc; num_sub_profiles; and general_subc_profile_idc[i].

SPS NAL Units that occur within a CMAF VVC track shall conform to constraints here with the following additional constraints. The following fields shall have predetermined values as follows: first, vui_parameters_present_flag shall be set to 1; and second if the profile_tier_level( ) structure is present in SPS, the condition of the following fields shall not change throughout a VVC elementary stream: general_profile_idc; general_tier_flag; general_level__idc; num_sub_profiles; and general_sub_profile_idc[i].

Image cropping parameters are now discussed. SPS and PPS cropping parameters conf_win_top_offset and conf_win_left_offset shall be set to 0. SPS and PPS cropping parameters conf_win_bottom_offset and conf_win_right_offset may be set to values other than 0. If set to non-zero values such syntax elements are expected to be used by the CMAF Player to remove video spatial samples not intended for display.

Video codec parameters are now discussed. VVC signaling of codecs parameters (Informational) is described below. Presentation applications should signal video codec profile and levels of each VVC track and CMAF switching set using parameters. Encryption is also discussed. The encryption of CMAF VVC Tracks and CMAF VVC Switching Sets shall use either the 'cenc' AES-CTR scheme or the 'cbes' AES-CBC subsample pattern encryption scheme. Furthermore, if the 'cbcs' mode of Common Encryption uses pattern encryption, then a Pattern Block length of 10 and an encrypt:skip pattern of 1:9 shall be applied.

The following are example technical problems solved by disclosed technical solutions. For example, in an example VVC CMAF design, the profile, tier, and level may be required to be signaled in the VPS and SPS, and hence may not change throughout a VVC elementary stream. However, for a VVC bitstream, a DCI NAL unit may instead be used to convey the required decoding capability for the entire bitstream, while allowing the profile, tier, and level to differ from CVS to CVS within the bitstream. This would allow more flexibility, which results in less transcoding and other processes needed in content preparation.

Disclosed herein are mechanisms to address one or more of the problems listed above. For example, a VVC elementary stream, also known as a VVC bitstream, may be included in a VVC CMAF track. The VVC elementary stream may include one or more CVSs. The profile, tier, and level (PTL) information for the bitstream may vary between the CVSs in the same bitstream. To allow for this functionality, the PTL information may be signaled in a DCI NAL unit, a VPS, and/or a SPS so long as corresponding constraint are maintained. In an example, a DCI NAL unit is required to be included in the CMAF track. In an example, when a plurality of DCI NAL units are included in the CMAF track, all DCI NAL units may be required to include the same content. In another example, the CMAF track may only include a single DCI NAL unit. In an example, the DCI NAL unit may be required to be included in a CMAF header sample entry. In various examples, a DCI NAL unit may contain a DCI number of PTL minus one (dci_numptls_minus1) (dci_numptls_minus1) field, a PTL frame only constraint flag (ptl_frame_only_constraint_flag) field, and a PTL multilayer enabled flag (ptl_multilayer_enabled_flag), which are required to be equal to zero, one, and zero, respectively. In an example, a CMAF track is limited to contain a single VPS. In an example, when no DCI NAL unit is present, various PTL related information in the VPS are required to be set to predetermined values and/or are required to remain the same between CVSs as discussed further below. In an example, various PTL related information in the SPS are required to be set to predetermined values and/or are required to remain the same between CVSs as discussed further below. In an example, timing related hypothetical reference decoder (HRD) parameters may also be required to remain the same between CVSs.

FIG. 1 is a schematic diagram illustrating an example CMAF track 100. A CMAF track 100 is a track of video data that has been encapsulated based on constraints specified in a CMAF standard. A CMAF track 100 is constrained to support delivery and decoding by a broad range of client devices according to adaptive streaming. In adaptive streaming, a media profile describes a plurality of different interchangeable representations, which allows a client device to select a desired representation based on decoder capabilities and/or current network conditions. A CMAF track 100 can support such functionality by containing a representation that is constrained to be decodable by a client that is capable of decoding at a corresponding profile, tier, and level (PTL), is capable of using corresponding coding tool, and/or is capable of meeting other predetermined constraints.

A CMAF track 123 can contain many types of decodable video streams. In the present example, the CMAF track 123 contains a VVC stream 121. A VVC stream 121, also known as a bitstream, is a stream of video data that has been coded according to the VVC standard. For example, the VVC stream 121 can include a stream of coded pictures and associated syntax that describes the coding process and/or other data that is useful for a decoder. The VVC stream 121 may contain one or more CVSs 117. A CVS 117 is a sequence of access units (AUs) in decoding order. An AU is a set of one or more pictures with a corresponding output/display time. As such, a CVS 117 contains a series of related pictures and corresponding syntax used to support decoding and/or describing the pictures.

A CVS 117 may comprise a DCI NAL unit 115, a VPS 111, a SPS 113, and/or coded video 119. A DCI NAL unit 115 contains information describing requirements for decoding video data in the CVS 117 and/or in the entire VVC stream 121. The DCI NAL unit 115 is optional, and may be omitted in some VVC streams 121 and/or CVSs 117. It should be noted that, while depicted as part of the VVC stream 121, a DCU NAL unit 115 may also be included in a CMAF header sample entry in the CMAF track 123 in some examples. A VPS 111 may contain data related to the entire VVC stream 121. For example, the VPS 111 may contain data related output layer sets (OLSs), layers, and/or sublayers used in the VVC stream 121. A VPS 111 is optional, and may be omitted in some VVC streams 121 and/or CVSs 117. A SPS 113 contains sequence data common to all pictures in a CVS 117 contained in the VVC stream 121. The parameters in a SPS 113 can include picture sizing, bit depth, coding tool parameters, bit rate restrictions, etc. The SPS 113 should be contained in at least one CVS 117. However, multiple CVS 117 can refer to the same SPS 113. Accordingly, a VVC stream 121 should contain one or more SPSs 113. The coded video 119 include pictures coded according to VVC and corresponding syntax.

The present disclosure relates to constraints applied to syntax elements contained in the DCI NAL unit 115, the VPS 111, and/or the SPS 113. In an example, the DCI NAL unit 115 may be required to be present in the CMAF track 123. In an example, when more than one DCI NAL unit 115 is present in a single CMAF track 123, all such DCI NAL units 115 may be required to include the same content. In some examples, a CMAF 123 track may be restricted to include one and only one DCI NAL unit 115. In such a case, multiple CVS 117 of video content may be described by a single DCI NAL unit 115. When present, the DCI NAL unit 115 may contain a DCI number of PTL minus one (dci_numptls_minus1) 132 and/or PTL syntax (profile_tier_tlevel) structure 130. A dci_num_ptls_minus1 132 may specify the number of profile_tier_level structures 130 contained in the DCI NAL unit 115 in minus one format. Minus one format indicates the syntax element contains one less than the actual value, and hence one is added to the value contained in the syntax element to determine the actual value. In an example, the dci_num_ptls_minus1 132 may be restricted to be equal to zero, which indicates a single profile_tier_level structure 130. This indicates that the CMAF track 123 contains video that complies to a single set of PTL information. The profile_tier_level structure 130 can be contained in the DCI NAL unit 115, the VPS 111, and/or the SPS 113, depending on the example, and is discussed in more detail hereinbelow.

In an example, the CMAF track 123 is restricted to contains one and only VPS 111. In such cases, multiple CVS 117 may be described by a single VPS 111. The VPS 111 may contain a VPS max layers minus one (vps_max_layers_minus1) field 134, a VPS number of PTLs minus one (vps_num_ptls_minus1) field 133, a general hypothetical reference decoder (HRD) parameters (general_timing_hrd-parameters) structure 131, and a profile_tier_level structure 130. The vps_max_layers_minus1 field 134 indicates a number of layers specified by the VPS 111 in minus one format. In an example, the vps_max_layers_minus1 field 134 may be restricted to contain a value of zero, which indicates the VPS 111 describes a single layer. The vps_num_ptls_minus1 field 133 may specify the number of profile_tier_level structures 130 contained in the VPS 111 in minus one format. In an example, the vps_num_ptls_minus1 field 133 may be restricted to contain a value of zero, which indicates the VPS 111 a single set of PTL information.

The general_timing_hrdparameters 131 may be contained in the VPS 111 and/or the SPS 113, depending on the example. For example, when a VPS 111 is included, the VPS 111 may contain the general_timing_hrd_parameters 131. When the VPS 111 is not included, the SPS may contain the general_timing_hrd_parameters 131. The general_timing_hrdjarameters 131 includes timing related parameters used by a HRD operating at an encoder. In general, the HRD can use the HRD parameters to check the VVC stream 121 for conformance with VVC standard. The general_timing_hrd_parameters 131 indicate to both the encoder the time parameters related to the coded video 119. For example, the general_timing_hrd_parameters 131 may indicate how quickly each picture should be decoded and reconstructed accurate display by the decoder. In an example, the general_timing_hrd_parameters 131 may contain a time scale (time_scale) field and a number of units in a tick (num_units_in_tick) field. The time_scale field indicates a number of time units that pass in a second, where time units correspond to a picture rate frequency of a video signal. The num_units_in_tick indicates a number of time units of a clock operating at the frequency of the time_scale in hertz (Hz) that corresponds to one increment, which is called a clock tick. In an example, the value of num_units_in_tick and time_scale in the general_timing_hrd_parameters 131 are restricted to remain unchanged between CVSs 117 in the same VVC stream 121. In an example, the value of num_units_in_tick and time_scale in the general_timing_hrd_parameters 131 are restricted to remain unchanged for the entire CMAF track 123.

A SPS 113 may contain general_timing_hrd_parameters 131 as discussed above, for example when no VPS 111 is included. The SPS 113 may also contain a profile_tier_level structures 130, for example when no DCI NAL unit 115 and/or VPS 111 is included. The SPS 113 may also contain a video usability information payload (vui_payload) structure 135. The vui_payload structure 135 contains information that describes how the coded video 119 should be used by a decoder. For example, the vui_payload structure 135 may include a video usability information progressive source flag (vui_progressive_source_flag) field 139 and video usability information interlaces source flag (vui_interlaced_source_flag) field 138. The vui_progressive_source_flag field 139 can be set to indicate whether video in the CMAF track 123 is coded according to progressive scanning. The vui_interlaced_source_flag field 138 can be set to indicate whether video in the CMAF track 123 is coded according to interlacing. In an example, the vui_interlaced_source_flag field 138, the vui_progressive_source_flag field 139, or both can be required to be set to one. This indicates the coded video 119 is coded according to interlacing, progressive scanning, or both.

As noted above, the DCI NAL unit 115, the VPS 111, and/or the SPS 113 may contain a profile_tier_level structure 130. The profile_tier_level structure 130 contains information relating to the profile, tier, and level used to code the coded video. The profile indicates a profile used to code the coded video. Different profiles have different coding characteristics (e.g., availability of different coding tools) such as different bit depth, different chroma sampling formats, cross component prediction availability, intra smoothing disabling availability. The tier indicates whether the coded video 119 is coded according to a high tier or a main tier, and hence is coded for demanding applications of general applications. The level indicates constraints on the coded video 119, such as bitrate maximums, maximum picture size, maximum sample rate, resolution at highest frame rate, maximum number of tiles, maximum number of slices per picture, etc. Accordingly, PTL information in the profile_tier_level structure 130 describes the capabilities a decoder must have in order to decode and display the coded video 119.

The profile_tier_level structure 130 may include a PTL frame only constraint flag (ptl_frame_only_constraint_flag) field 141, a PTL multilayer enabled flag (ptl_multilayer_enabled_flag) 143, a general profile identification code (general_profile_idc) 145, a general tier flag (general_tier_flag) 147, a general level identification code (general_level_idc) 149, a number of sublayer profiles (num_sub_profiles) 142, and/or a general sublayer profile identification code for each ith interoperability indicator (general_sub_profile_idc[i]) 144. The ptl_frame_only_constraint_flag field 141 specifies whether a CVS 117 conveys pictures that represent frames (e.g., complete screen images) or fields (e.g., partial screen images intended to be combined to fill a screen). In an example, a constraint may require the ptl_frame_only_constraint_flag field 141 to be set to one, which indicates the coded video 119 include pictures coded as frames. The ptl_multilayer_enabled_flag 143 indicates whether the coded video 119 is coded in multiple layers. In an example, the ptl_multilayer_enabled_flag 143 is set to zero, which indicates the coded video 119 is coded in a single layer.

The general_profile_idc 145, the general_tier_flag 147, and the general_level_idc 149 indicate the profile, tier, and level, respectively, of the coded video 119. The general_sub_profile_idc[i] 144 indicate zero through i values of interoperability indicators. The num_sub_profiles 142 indicates the number of syntax elements contained in general_sub_profile_idc[i] 144. In an example, the values contained in general_profile_idc 145, general_tier_flag 147, general_level_idc 149, num_sub_profiles 142, and general_sub_profile_idc[i] 144 are required to remain unchanged between CVSs 117 in the same VVC stream. In another example, the values contained in general_profile_idc 145, general_tier_flag 147, general_level_idc 149, num_sub_profiles 142, and general_sub_profile_idc[i] 144 are required to remain unchanged in the CMAF track 123.

To solve the above problems, and others, methods as summarized below are disclosed. The items should be considered as examples to explain the general concepts and should not be interpreted in a narrow way. Furthermore, these items can be applied individually or combined in any manner.

Example 1

In one example, a rule may specify that a DCI NAL unit should be present in a VVC CMAF track.

Example 2

In one example, a rule may specify that a DCI NAL unit shall be present in a VVC CMAF track.

Example 3

In one example, a rule may specify that all DCI NAL units present in a VVC CMAF track shall have the same content.

Example 4

In one example, a rule may specify that there shall be only and only one DCI NAL unit present in a VVC CMAF track.

Example 5

In one example, a rule may specify that, when a DCI NAL unit is present in a VVC CMAF track, a DCI NAL unit shall be present in the CMAF header sample entry.

Example 6

In one example, a rule may specify that the value of the dci_num_ptls_minus1 field in a DCI NAL unit in in a VVC CMAF track shall be equal to 0.

Example 7

In one example, a rule may specify that the value of the ptl_frame_only_constraint_flag field in the profile_tier_level( ) structure in a DCI NAL unit in a VVC CMAF track shall be equal to 1.

Example 8

In one example, a rule may specify that the value of the ptl_multilayer_enabled_flag field in the profile_tier_level( ) structure in a DCI NAL unit in a VVC CMAF track shall be equal to 0.

Example 9

In one example, a rule may specify that there shall be one and only one VPS unit present in a VVC CMAF track.

Example 10

In one example, a rule may specify that when no DCI NAL unit is present in a VVC CMAF track and one or more VPSs are present in the VVC CMAF track, one or more of the following constraints apply. The constraints include that the value of the vps_max_layers_minus1 field shall be equal to 0 for each VPS, and the value of the vps_num_ptls_minus1 field shall be equal to 0 for each VPS.

In an example, the following constraints apply to the profile_tier_level( ) structure in each VPS. Such constraints include that the value of the ptl_frame_only_constraint_flag field shall be equal to 1; and the value of the ptl_multilayer_enabled_flag field shall be equal to 0.

In an example, the value for each of the following fields in the profile_tier_level( ) structure of the referenced VPS shall not change from one coded video sequence to another throughout a VVC elementary stream: general_profile_idc; general_tier_flag; general_level_idc; num_sub_profiles; and general_sub_profile_idc[i] for each of the i values. In an example, a rule may require the value for each of these fields to be the same for all VPSs present in a VVC CMAF track.

Example 11

In one example, a rule may specify that the value of the vui_progressive_source_flag field in the vui_payload( ) structure in a SPS in a VVC CMAF track shall be equal to 1.

Example 12

In one example, a rule may specify that the value of the vui_interlaced_source_flag field in the vui_payload( ) structure in a SPS in a VVC CMAF track shall be equal to 1.

Example 13

In one example, a rule may specify that when no DCI NAL unit is present and no VPS is present in a VVC CMAF track, the value for each of the following fields in the profile_tier_level( ) structure of the referenced SPS shall not change from one coded video sequence to another throughout a VVC elementary stream: generalprofile_idc; general_tier__flag; general_level_idc; num_subprofiles; and general_sub_profile_idc[i] for each of the i values. In an example, a rule may require the value for each of these fields to be the same for all SPSs present in a VVC CMAF track.

Example 14

In one example, a rule may specify that the value for each of the following fields in the general_timing_hrd_parameter( ) structure, when present, in the referenced VPS or SPS, shall not change from one coded video sequence to another throughout a VVC elementary stream: num_units_in_tick; and time_scale. In an example, a rule may require that the value for each of the these fields shall be the same for all the general_timing_hrd_parameter( ) structures in the VPSs or SPSs present in a VVC CMAF track.

An embodiment of the preceding examples is now described. This embodiment can be applied to CMAF. Relative to the VVC CMAF specification, most relevant parts that have been added or modified are shown in bold underline font, and some of the deleted parts are shown in bold italics fonts. There may be some other changes that are editorial in nature and thus not highlighted.

X.1 VVC video CMAF tracks. VVC CMAF tracks shall conform to the requirements of NAL structured video CMAF tracks. In addition, it shall conform to all remaining requirements in this Annex. If a CMAF Track conforms to these requirements, it is referred to as a VVC video CMAF track and may use the brand 'cvvc'.

X.2 VVC video track constraints. X.2.1 VVC video CMAF switching set constraints. Every CMAF track in a CMAF switching set shall conform to VVC video CMAF track as defined in clause X.1. VVC video CMAF switching sets shall conform to constraints for NAL structured video CMAF switching sets.

X.2.2 Visual sample entry. The syntax and values of a visual sample entry of a VVC video track shall conform to VVCSampleEntry ('vvc1') or VVCSampleEntry ('vvci''vvi1') sample entries.

X.3 Constraints on VVC elementary streams. X.3.1 Decoding Capability Indication (DCI) NAL Unit. A DCI NAL unit indicates a decoding capability for decoding of the entire VVC bitsteam. A DCI NAL unit should be present in a VVC CMAF track. All DCI NAL units present in a VVC CMAF track shall have the same content. When a DCI NAL unit is present in a VVC CMAF track, a DCI NAL unit shall be present in the CMAF header sample entry, and the following additional constraints apply for the DCI NAL unit present in the CMAF header sample entry: The value of the dci_num_ptls_minus1 field shall be equal to 0. The following constraints apply to the profile_tier_level( ) structure in the DCI NAL unit: The value of the ptl_frame_only_constraint_flag field shall be equal to 1. The value of the ptl_multilayer_enabled_flag field shall be equal to 0.

X.3.2 Video Parameter Sets (VPS). Each VVC video media sample in a CMAF track shall reference a SPS with sps_video_parameter_set_id equal to 0, in which case there is no VPS in the elementary stream, or shall reference the a VPS in the CMAF header sample entry. If present, When no DCI NAL unit is present and one or more VPSs are present, the following additional constraints apply: The value of the vps_max_layers_minus1 field shall be equal to 0 for each VPS. The value of the vps_num_ptls_minus1 field shall be equal to 0 for each VPS. The following constraints apply to the profile_tier_level( ) structure in each VPS: The value of the ptl_frame_only_constraint_flag field shall be equal to 1. The value of the ptl_multilayer_enabled_flag field shall be equal to 0. For each profile_tier_level( ) structure in VPS, the value of the following fields shall not change throughout a VVC elementary stream: The value for each of the following fields in the profile_tier_level( ) structure of the referenced VPS shall not change from one coded video sequence to another throughout a VVC elementary stream: general_profile_idc, general_tier_flag, general_level_idc, num_sub_profiles, general_sub_profile_idc[i] for each of the i values.

X.3.3 Sequence Parameter Sets (SPS). Sequence Parameter Set NAL Units that occur within a CMAF VVC track shall conform with the following additional constraints: The following fields shall have pre-determined values as follows: sps_vui_parameters_present_flag shall be set to 1. The following constraints apply to the vui_payload( ) structure in each SPS: The value of the vui_progressive_source_flag field shall be equal to 1. The value of the vui_interlaced_source_flag field shall be equal to 0. If the profile_tier_level( ) structure is present in SPS the condition of the following fields When no DCI NAL unit is present and no VPS is present, the value for each of the following fields in the profile_tier_level( ) structure of the referenced SPS shall not change from one coded video sequence to another throughout a VVC elementary stream: general_profile_idc, general_tier_flag, general_level_ide, num_sub_profiles, and general_sub_profile_idc[i] for each of the i values.

X.3.4 Timing parameters. The value for each of the following fields in the general_timing_hrd_parameters( ) structure, when present, in the referenced VPS or SPS, shall not change from one coded video sequence to another throughout a VVC elementary stream: num_units_in_tick, and time scale.

X.3.5 Image cropping parameters. SPS and PPS cropping parameters sps_conf_win_top_offset/pps_conf_win_top_offset and sps_conf_win_left_offset/pps_conf_win_left_offset shall be set to 0. SPS and PPS cropping parameters sps_conf_win_bottom_offset/pps_conf_win_bottom_offset and sp_sconf_win_right_offset/pps_conf_win_right_offset may be set to values other than 0. If set to non-zero values it is expected to be used by the CMAF Player to remove video spatial samples not intended for display.

Figure 2:
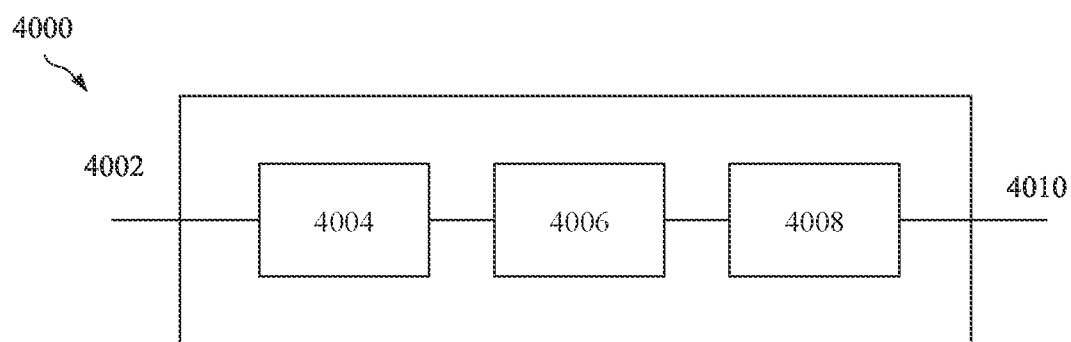
FIG. 2 is a block diagram showing an example video processing system.

FIG. 2 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multicomponent pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4000 may include a coding component 4004 that may implement the various coding or encoding methods described in the present document. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 3:
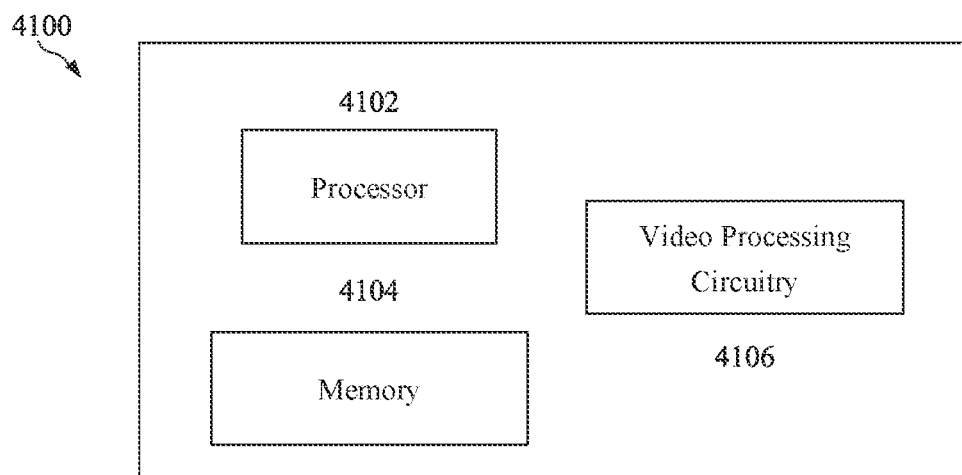
FIG. 3 is a block diagram of an example video processing apparatus.

FIG. 3 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present document. The memory (memories) 4104 may be used for storing data and code used for implementing the methods and techniques described herein. The video processing circuitry 4106 may be used to implement, in hardware circuitry, some techniques described in the present document. In some embodiments, the video processing circuitry 4106 may be at least partly included in the processor 4102, e.g., a graphics co-processor.

Figure 4:
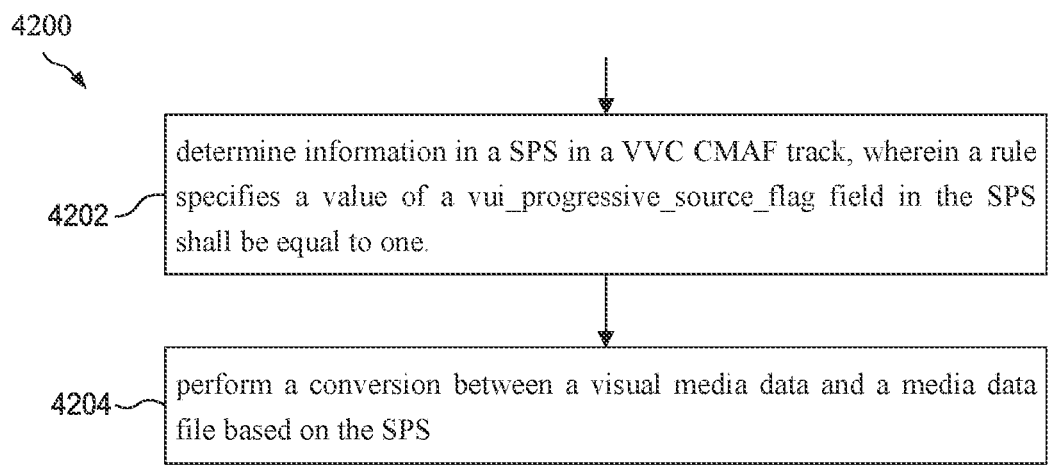
FIG. 4 is a flowchart for an example method of video processing.

FIG. 4 is a flowchart for an example method 4200 of video processing. The method 4200 includes determining information in a SPS in a VVC CMAF track at step 4202. In an example, a rule specifies a value of a vui_progressive_source_flag field in the SPS shall be equal to one. In an example, the vui_progressive_source_flag is included in a vui_payload structure. In an example, the vui_progressive_source_flag is equal to one to indicate video in the VVC CMAF track is coded according to progressive scanning. In an example, the rule specifies a value of vui_interlaced_source_flag field in the SPS shall be equal to one. In an example, the vui_interlaced_source_flag is included in a vui_payload structure. In an example, the vui_interlaced_source_flag is equal to one to indicate video in the VVC CMAF track is coded according to interlacing. In an example, the SPS is contained in a VVC elementary stream, and wherein the VVC elementary stream is contained in the CMAF track.

At step 4204, a conversion is performed between a visual media data and a media data file based on the SPS. When the method 4200 is performed on an encoder, the conversion comprises generating the media data file according to the visual media data. The conversion includes determining and encoding the SPS into a bitstream contained in the CMAF track. When the method 4200 is performed on a decoder, the conversion comprises parsing and decoding a bitstream in the CMAF track according to the SPS to obtain the visual media data.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 5:
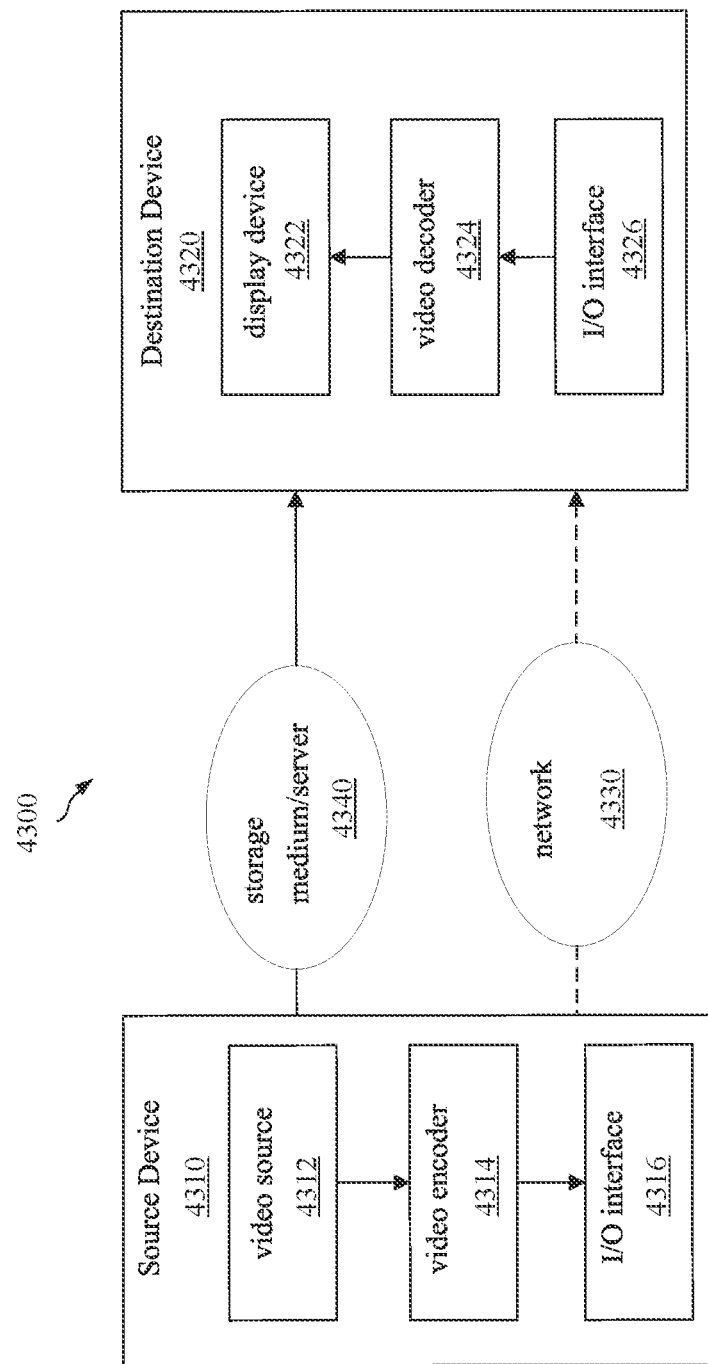
FIG. 5 is a block diagram that illustrates an example video coding system.

FIG. 5 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVM) standard and other current and/or further standards.

Figure 6:
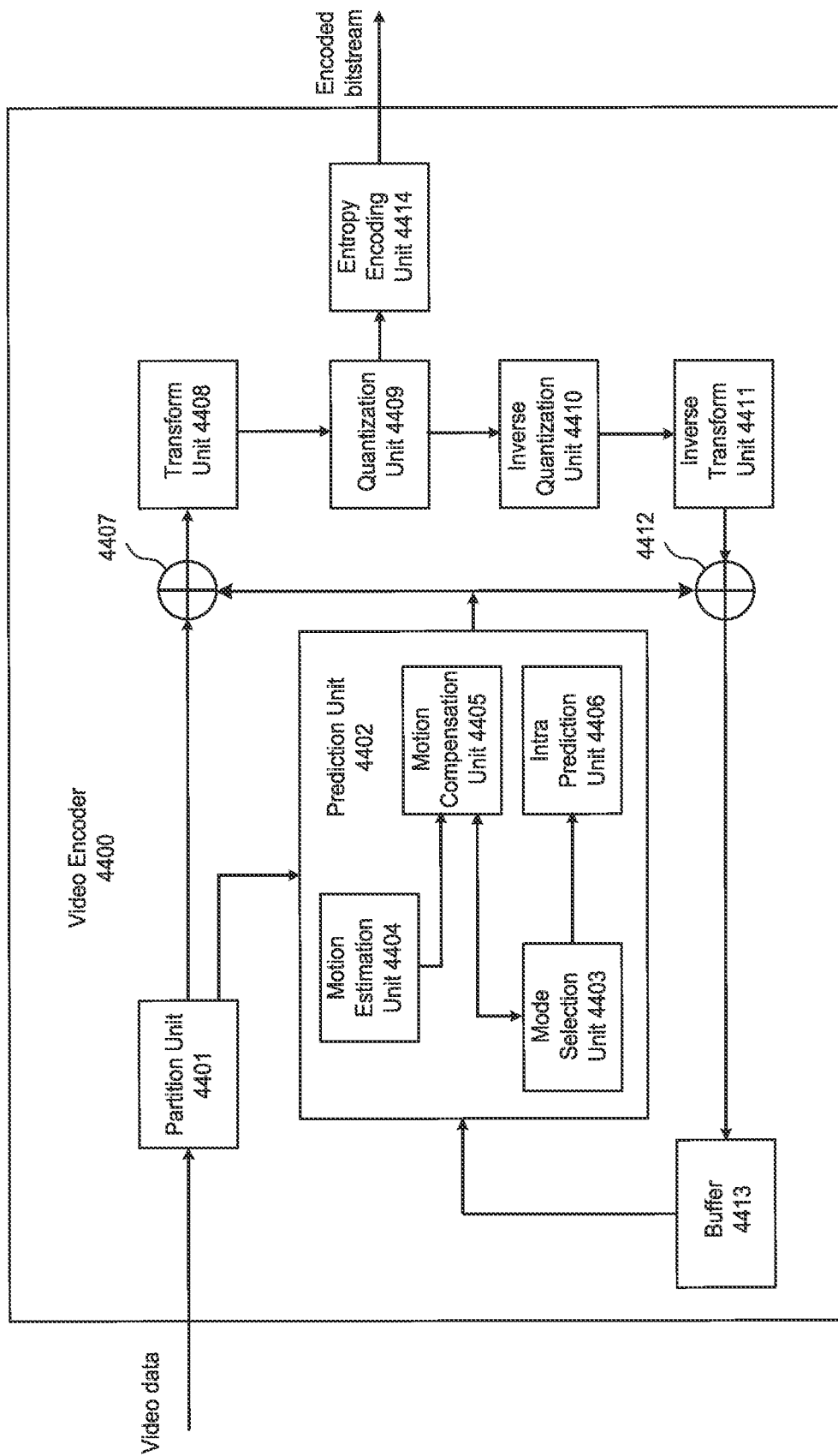
FIG. 6 is a block diagram that illustrates an example encoder.

FIG. 6 is a block diagram illustrating an example of video encoder 4400, which may be video encoder 4314 in the system 4300 illustrated in FIG. 5. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 7:
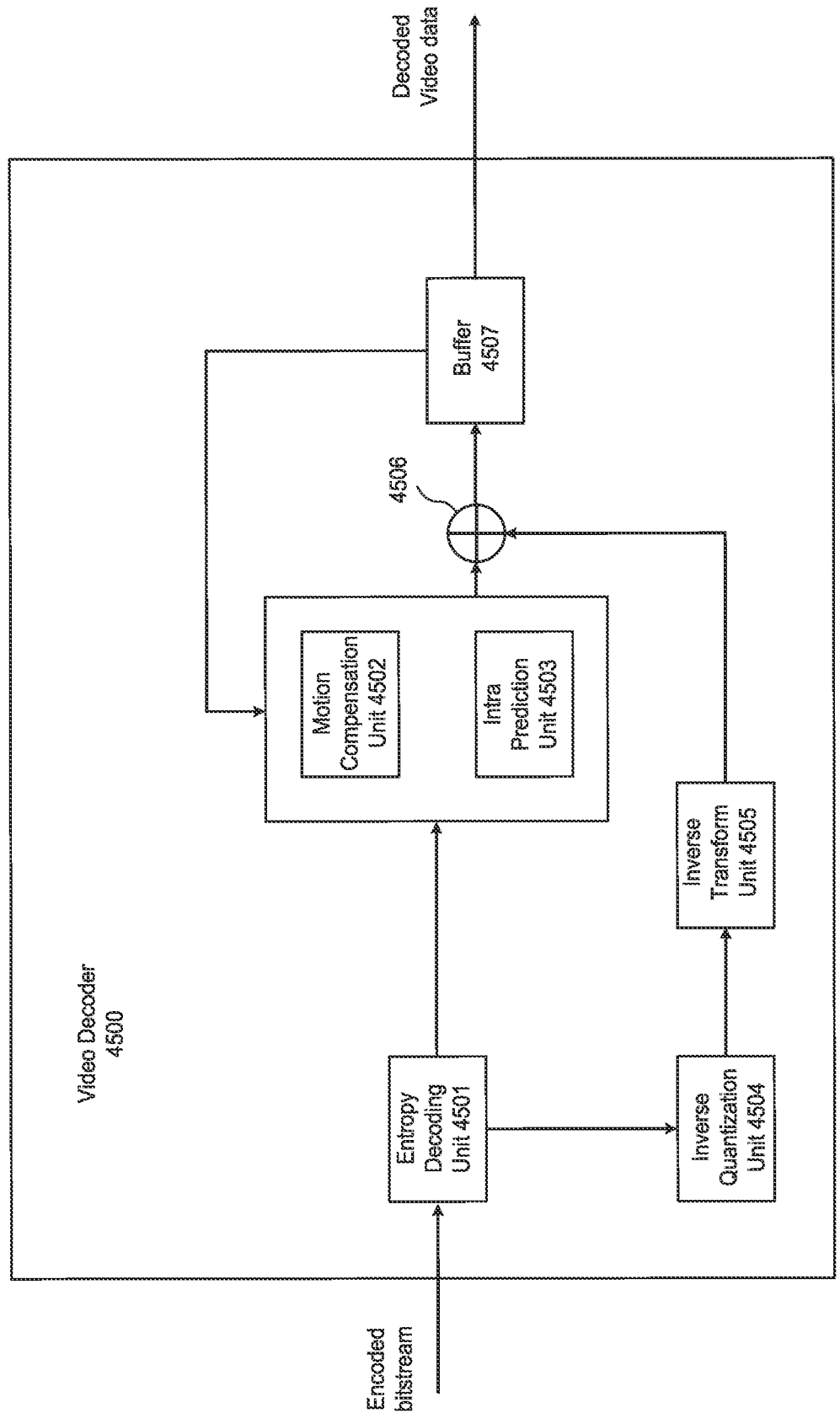
FIG. 7 is a block diagram that illustrates an example decoder.

FIG. 7 is a block diagram illustrating an example of video decoder 4500 which may be video decoder 4324 in the system 4300 illustrated in FIG. 5. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 8:
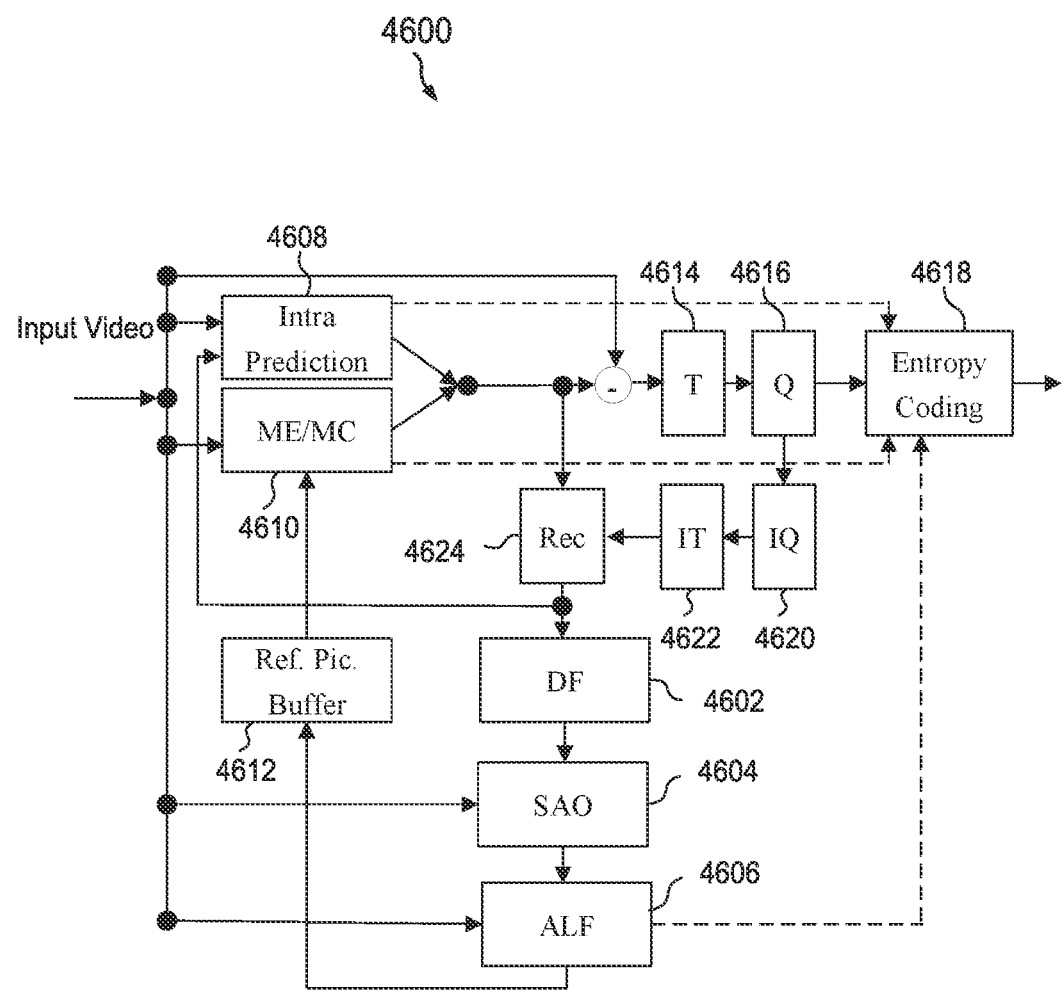
FIG. 8 is a schematic diagram of an example encoder.

FIG. 8 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of techniques discussed herein.

1. A method of media data processing (e.g., method 4200 depicted in FIG. 4), comprising: performing a conversion between a visual media information and a digital representation of the visual media information according to a rule, wherein the rule specifies whether or how a decoding capability information (DCI) network abstraction layer (NAL) unit is included in a track of a coded elementary stream in the digital representation.

2. The method of solution 1, wherein the rule specifies that the DCI NAL unit is included in each track of the coded elementary stream.

3. The method of any of solutions 1-2, wherein the rule specifies that in case that multiple DCI NAL units are included in the track of the coded elementary stream, the multiple DCI NAL units have identical contents.

4. The method of any of solutions 1-2, wherein the rule specifies that exactly one DCI NAL unit is included in the track of the coded elementary stream.

5. The method of solution 1, wherein the rule specifies that the DCI NAL unit, when present in the track of the coded elementary stream, is constrained to be in a header sample entry of the track.

6. The method of solution 1-5, wherein the rule specifies that the DCI NAL unit conforms to a constraint that a value of a field in the DCI NAL unit is constrained to be equal to a predetermined value.

7. The method of solution 6, wherein the field indicates a number of profile, tier, layer structures minus 1, and wherein the predetermined value is equal to 0.

8. The method of solution 6, wherein the field indicates whether multilayer indication of profile-tier-level is enabled, and wherein the predetermined value is equal to 1.

9. A method of media data processing, comprising: performing a conversion between a visual media information and a digital representation of the visual media information according to a rule, wherein the rule specifies whether or how a video parameter set (VPS) unit is included in a track of a coded elementary stream in the digital representation.

10. The method of solution 9, wherein the rule specifies that only one VPS unit is included in the track of the coded elementary stream.

11. The method of any of solutions 9-10, wherein the rule specifies that, in case that the track of the coded elementary stream includes the VPS unit but no decoding capability information (DCI) network abstraction layer (NAL) units, the digital representation satisfies a constraint.

12. The method of any of solution 9-11, wherein the rule specifies that the VPS conforms to a constraint that a value of a field in the VPS is constrained to be equal to a predetermined value.

13. The method of any of solutions 9-12, wherein the rule specifies that, in case that the track of the coded elementary stream includes no VPS unit and a decoding capability information (DCI) network abstraction layer (NAL) units, the digital representation satisfies a constraint.

14. A method of media data processing, comprising: performing a conversion between a visual media information and a digital representation of the visual media information according to a rule, wherein the rule specifies whether or how a value of a field included in a hypothetical reference decoder structure that is referenced by a video parameter set of a sequence parameter set is allowed to change from one coded video sequence to a second coded video sequence in a coded video elementary stream in the digital representation.

15. The method of solution 14, wherein the value indicates of a time scale.

16. The method of any of solutions 14-15, wherein the rule specifies that the value of the field is the same in each hypothetical reference decoder structure in the digital representation.

17. A method of media data processing, comprising: obtaining a digital representation of the visual media information, wherein the digital representation is generated according to a method described in any of solutions 1-16; and streaming the digital representation.

18. A method of media data processing, comprising: receiving a digital representation of the visual media information, wherein the digital representation is generated according to a method described in any of solutions 1-16; and generating the visual media information from the digital representation.

19. The method of any of solutions 1-18, wherein the conversion comprises generating a bitstream representation of the visual media data and storing the bitstream representation to the file according to the format rule.

20. The method of any of solutions 1-18, wherein the conversion comprises parsing the file according to the format rule to recover the visual media data.

21. A video decoding apparatus comprising a processor configured to implement a method recited in one or more of solutions 1 to 20.

22. A video encoding apparatus comprising a processor configured to implement a method recited in one or more of solutions 1 to 20.

23. A computer program product having computer code stored thereon, the code, when executed by a processor, causes the processor to implement a method recited in any of solutions 1 to 20.

24. A computer readable medium on which a bitstream representation complying to a file format that is generated according to any of solutions 1 to 20.

25. A method, apparatus or system described in the present document. In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data comprising:
   acquiring information in a sequence parameter set (SPS) in a Versatile Video Coding (VVC) Common Media Application Format (CMAF) track based on a rule, wherein the rule specifies a value of a video usability information progressive source flag (vui_progressive_source_flag) field in the SPS is constrained to be equal to one; and
   performing a conversion between a visual media data and a media data file based on the SPS,
   wherein the rule specifies a value of video usability information interlaces source flag (vui_interlaced_source_flag) field in the SPS is constrained to be equal to one.

2. The method of claim 1, wherein the vui_progressive_source_flag is included in a video usability information payload (vui_payload) structure.

3. The method of claim 2, wherein the vui_progressive_source_flag is equal to one to indicate that a video in the VVC CMAF track is coded according to progressive scanning.

4. The method of claim 1, wherein the vui_interlaced_source_flag is included in a video usability information payload (vui_payload) structure.

5. The method of claim 4, wherein the vui_interlaced_source_flag is equal to one to indicate that a video in the VVC CMAF track is coded according to interlacing.

6. The method of claim 1, wherein the SPS is contained in a VVC elementary stream, and wherein the VVC elementary stream is contained in the CMAF track.

7. The method of claim 1, wherein the conversion includes encoding the visual media data into the media data file.

8. The method of claim 1, wherein the conversion includes decoding the visual media data from the media data file.

9. An apparatus for processing video data comprising:
   a processor; and
   a non-transitory memory with instructions thereon, wherein the instructions upon execution by the processor, cause the processor to:
   acquire information in a sequence parameter set (SPS) in a Versatile Video Coding (VVC) Common Media Application Format (CMAF) track based on a rule, wherein the rule specifies a value of a video usability information progressive source flag (vui_progressive_source_flag) field in the SPS is constrained to be equal to one; and
   perform a conversion between a visual media data and a media data file based on the SPS,
   wherein the rule specifies a value of video usability information interlaces source flag (vui_interlaced_source_flag) field in the SPS is constrained to be shall-be-equal to one.

10. The apparatus of claim 9, wherein the vui_progressive_source_flag is included in a video usability information payload (vui_payload) structure.

11. The apparatus of claim 10, wherein the vui_progressive_source_flag is equal to one to indicate that a video in the VVC CMAF track is coded according to progressive scanning.

12. The apparatus of claim 9, wherein the vui_interlaced_source_flag is included in a video usability information payload (vui_payload) structure.

13. The apparatus of claim 12, wherein the vui_interlaced_source_flag is equal to one to indicate that a video in the VVC CMAF track is coded according to interlacing.

14. The apparatus of claim 9, wherein the SPS is contained in a VVC elementary stream, and wherein the VVC elementary stream is contained in the CMAF track.

15. A non-transitory computer readable medium comprising a computer program product for use by a video coding device, the computer program product comprising computer executable instructions stored on the non-transitory computer readable medium such that when executed by a processor cause the video coding device to:
  acquire information in a sequence parameter set (SPS) in a Versatile Video Coding (VVC) Common Media Application Format (CMAF) track based on a rule, wherein the rule specifies a value of a video usability information progressive source flag (vui_progressive_source_flag) field in the SPS is constrained to be equal to one; and
  perform a conversion between a visual media data and a media data file based on the SPS,
  wherein the rule specifies a value of video usability information interlaces source flag (vui_interlaced_source_flag) field in the SPS is constrained to be shall-be-equal to one.

16. The non-transitory computer readable medium of claim 15, wherein the vui_progressive_source_flag is included in a video usability information payload (vui_payload) structure.

17. The non-transitory computer readable medium of claim 16, wherein the vui_progressive_source_flag is equal to one to indicate that a video in the VVC CMAF track is coded according to progressive scanning.

18. The non-transitory computer readable medium of claim 15, wherein the vui_interlaced_source_flag is included in a video usability information payload (vui_payload) structure.

19. The non-transitory computer readable medium of claim 18, wherein the vui_interlaced_source_flag is equal to one to indicate that a video in the VVC CMAF track is coded according to interlacing.

20. The non-transitory computer readable medium of claim 15, wherein the SPS is contained in a VVC elementary stream, and wherein the VVC elementary stream is contained in the CMAF track.

* * * * *